United States Patent [19]

Sharp-Dent et al.

[11] 4,084,652
[45] Apr. 18, 1978

[54] WEIGHING APPARATUS

[75] Inventors: Charles Edward Arthur Sharp-Dent; John Owen Hounsell, both of Uxbridge, England

[73] Assignee: Wright Machinery Company Limited, Uxbridge, England

[21] Appl. No.: 682,460

[22] Filed: May 3, 1976

[30] Foreign Application Priority Data
May 2, 1975 United Kingdom ...... 18582/75

[51] Int. Cl.² ............................................. G01G 5/02
[52] U.S. Cl. ..................................... 177/207; 177/189
[58] Field of Search ................ 177/207, 211, 210 EM, 177/225, 254, 255, 189; 267/161

[56]  References Cited
U.S. PATENT DOCUMENTS

| 2,597,949 | 5/1952 | Rappaport | 177/207 |
| 2,767,973 | 10/1956 | Ter Veen | 267/161 X |
| 3,097,714 | 7/1963 | Vickery | 177/225 X |

Primary Examiner—Joseph W. Hartary
Attorney, Agent, or Firm—Brisebois & Kruger

[57] ABSTRACT

The invention concerns a weighing apparatus for weighing in rapid sequence a series of small weights particularly for use in the packaging industry. The apparatus incorporates a float which is resiliently suspended for vertical movement but held against transverse or torsional movement. The float cooperates with measuring means operative to give an electrical output signal.

2 Claims, 3 Drawing Figures

WEIGHING APPARATUS

The present invention concerns weighing apparatus and is particularly, though not exclusively, concerned with apparatus for weighing in rapid sequence a series of small weights.

Such weighing apparatus finds particular application in the packaging industry where a material to be packaged has to be separated into discrete portions before being packaged in individual containers. In this field it is essential that the weighing be carried out accurately so that the discrete portions are not underweight but are as consistently close to the desired weight as possible.

It is already known to deposit the material to be weighed on to a float, the sinking of the float by a predetermined amount triggering a switch to stop the delivery of material to that float.

This system has the disadvantage that it tends to deliver too great a quantity of material because of the inherent time delay in the switching and the necessity of ensuring that the weighed material is not underweight.

Furthermore care has to be taken that the response of the float to delivered material is neither too rapid nor too sluggish in order to ensure that the trigger switching action occurs when the required weight of material has been delivered.

In accordance with the present invention there is provided weighing apparatus comprising a float for carrying a receptable for receiving material to be weighed, suspension means resiliently supporting the float so that the float can move substantially vertically in a liquid medium under a load but restraining the float against transverse or torsional movement, and measuring means operative to give an electrical output signal varying in accordance with the vertical movement of the float.

Preferably the suspension means comprise a pair of spider members of resilient material respectively secured in the upper and lower ends of the float. Thus each suspension member may comprise an integral body with a circular rim portion having a plurality of spokes extented generally helically inwardly to a hub portion. In a preferred embodiment the float is mounted upon a stem extending through coaxial apertures in the hub portions of the suspension members, the outer rims of the suspension members being secured to the walls of a chamber in which the float can move.

In accordance with a feature of the present invention, the float may be located in an inner chamber disposed coaxially within a main float chamber, the inner chamber having an opening through which the liquid medium can pass from the mai float chamber to the interior of the inner chamber.

In accordance with a further feature of the invention the main float chamber may be connected to an outer casing solely by a plurality of vibration damping devices. Furthermore the apparatus may be provided with adjustable damping means for damping the movement of the float in response to a load imposed thereon.

An embodiment of the present invention will now be described by way of example and with reference to the accompanying drawings, in which.

Figure 3:
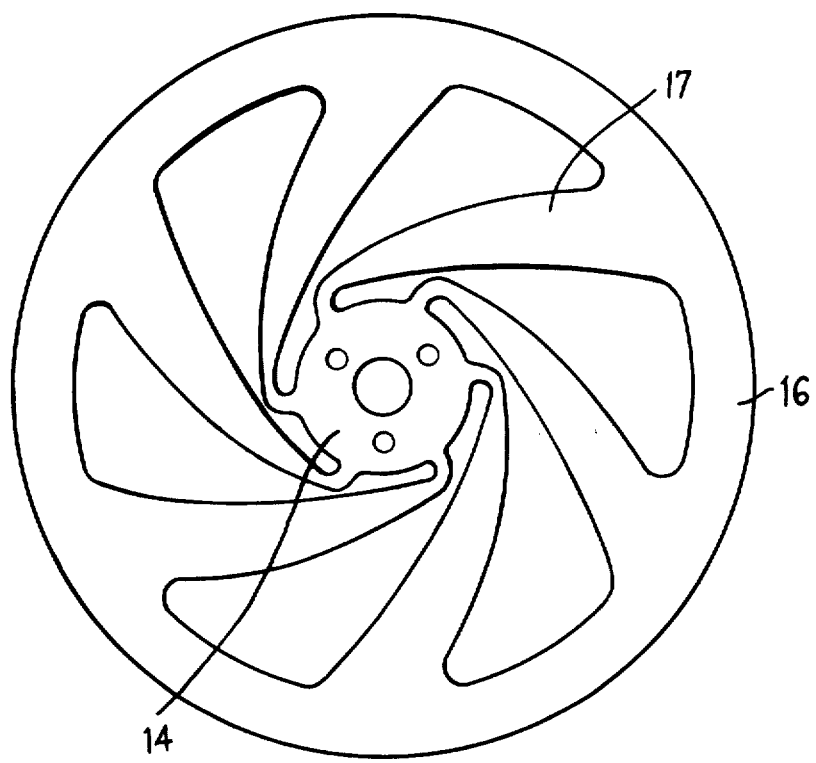
FIG. 3 is a plan view of a flexible suspension member used in the embodiment of FIG. 1.

The weighing apparatus shown in the accompanying drawings comprises a generally U-shaped support or bucket 1 on which material to be weighed can be deposited and which is mounted on the upper end of a vertical stem 2. The stem 2 consists of an upper section 3 firmly screwed into a lower section 4. The lower section 4 of the stem 2 passes through and is rigidly connected to a float 5. A cylindrical main float chamber 6 surrounds the float 5 and is filled with fluid as indicated at 7. However, in order to prevent unwanted movement of the oil generated by external vibrations from causing unwanted oscillations of the float 5 the weighing apparatus is also provided with an inner float chamber 8 coaxial with the main chamber 6, the fluid having access to this inner chamber via an opening 9 in the base plate 10 of the inner chamber 8. The upper rims of the wall of the float chambers 6 and 8 are sealed to a cover plate 11 carrying a removable cap 11' and the stem 2 projects through plate 11 and cap 11' with freedom for axial movement. The upper end of lower section 4 of stem 2 is provided with a circular flange 12 which abuts a correspondingly shaped flange 13 on the lower end of upper section 3 so as to trap and firmly hold the hub portion 14 of a suspension member in the form of a circular spider or flexure 15. This spider can be most clearly seen in FIG. 3 of the accompanying drawings and consists of a circular rim 16 and six spokes 17 extending helically inwardly to the hub 14. In this embodiment the spider 15 is made from beryllium-copper though other resilient materials suitable for making springs may be employed. The flanges 12 and 13 are each provided with three cooperating bores 18 and the hub 14 of the spider is also provided with three holes 19 which can register with the bores 18 so that the spider 15 can be firmly located between the flanges 12 and 13 by appropriate spigots. The lower end of lower section 4 of stem 2 is provided with a flange 20 similar to the flange 12 and the hub 14 of a spider 21 similar to spider 15 is firmly mounted between the flange 20 and a ring member 21 in a manner analagous to the mounting of the spider 15. The outer rim 16 of the spiders 15 and 21 are firmly connected to the inner wall of the inner float container 8. The result of mounting the float 5 in this manner is that it is free to move vertically with the stem 2 but is firmly restrained against transverse and torsional movement.

The upper section 3 of stem 2 is provided with a flange 23 providing a seat for a metal collar 24 which is firmly mounted on the upper section 3. The collar 24 has two functions. Firstly, it carries an arm 25 in engagement with the cantilever arm of a strain gauge 26 mounted on the cover plate 11. The strain gauge 26 is of a type that is well known and essentially consists of a cantilever arm on which is mounted a small semi-conductor chip forming part of a Wheatstone bridge. Movement of one end of this cantilever arm sets up strains in the semi-conductor chip which unbalance the Wheatstone bridge. The Wheatstone bridge in turn forms part of conventional measuring apparatus which gives an electrical output signal which varies with the amount of movement of the cantilever arm in response to the movement of float 5. In the embodiment being described the cantilever arm of the strain gauge has a full range deflection of approximately 35 thou. of an inch.

The collar 24 is also provided with a substantially semi-circular projection 27 carrying the plunger 28 of a damping device 29. The construction of the damping device 29 is also well known and essentially consists of a wall 30 containing a viscous fluid such as oil in which the plunger 28 can move. The plunger 28 is divided into two portions 31,32 between which the fluid must flow as the plunger moves relative to the well 30, the damping effect being generated by the viscosity of the fluid and the separation between the portions 31 and 32. This separation is controlled by a knurled knob 33 connected to the lower portion 32 by a screw-threaded shank.

The rate of response of the bucket 1 to an imposed load is controlled by the damping device 29.

The product being weighed is dropped into the bucket, thus producing a dynamic force in excess of a static weight. The damping is adjusted to counteract the kinetic energy thus generated.

Downward movement of the stem 2 is limited by a small collar 34 rigidly secured to the stem 2 so that in the event of an excessive weight loading on the bucket 1 the strain gauge 26 will be protected from damage. In normal use the bucket 1 sinks through about 0.005 inch in response to a one ounce load to be weighed.

Figure 1:
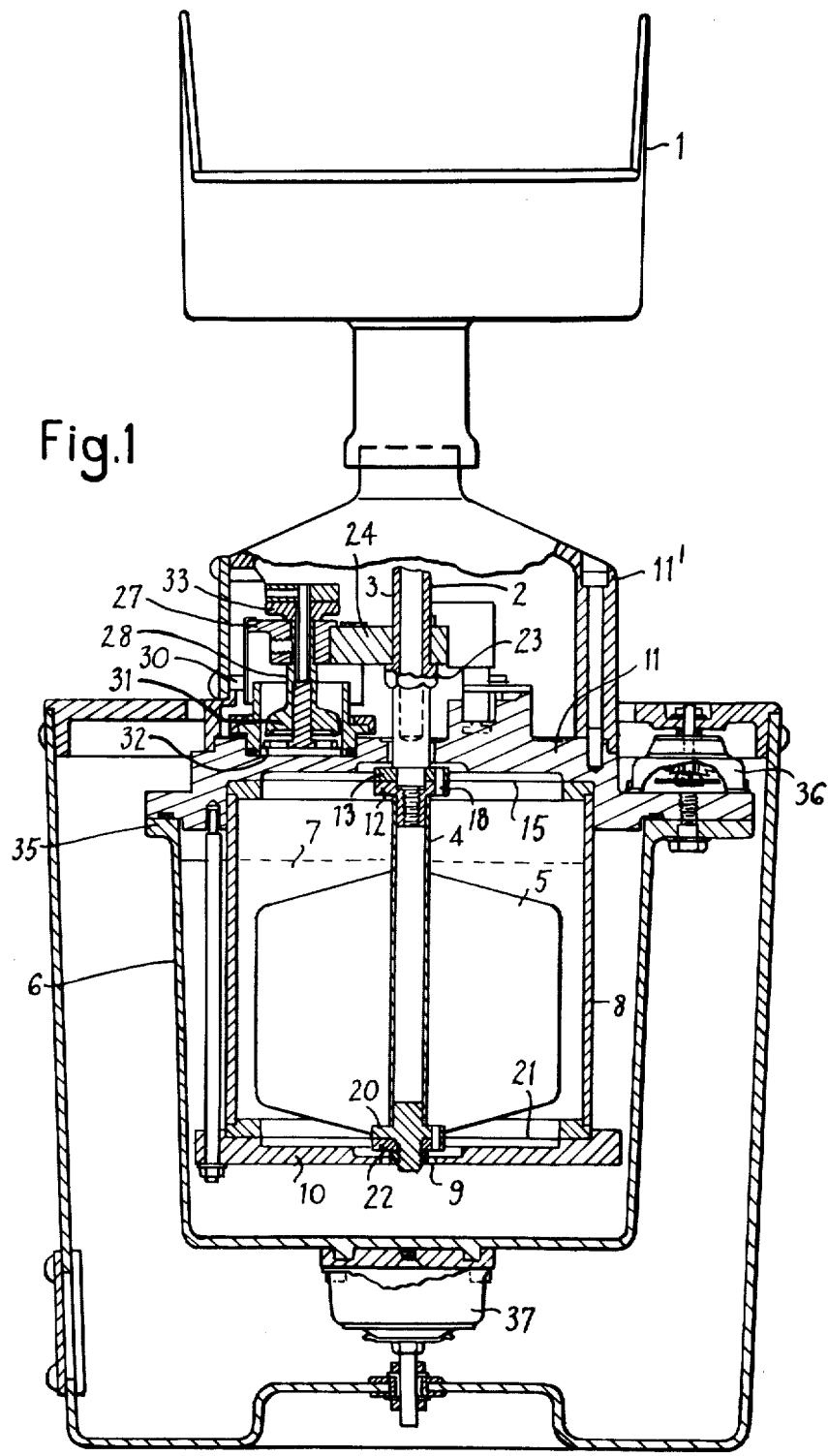
FIG. 1 is an axial section through weighing apparatus constructed in accordance with the present invention.
Figure 2:
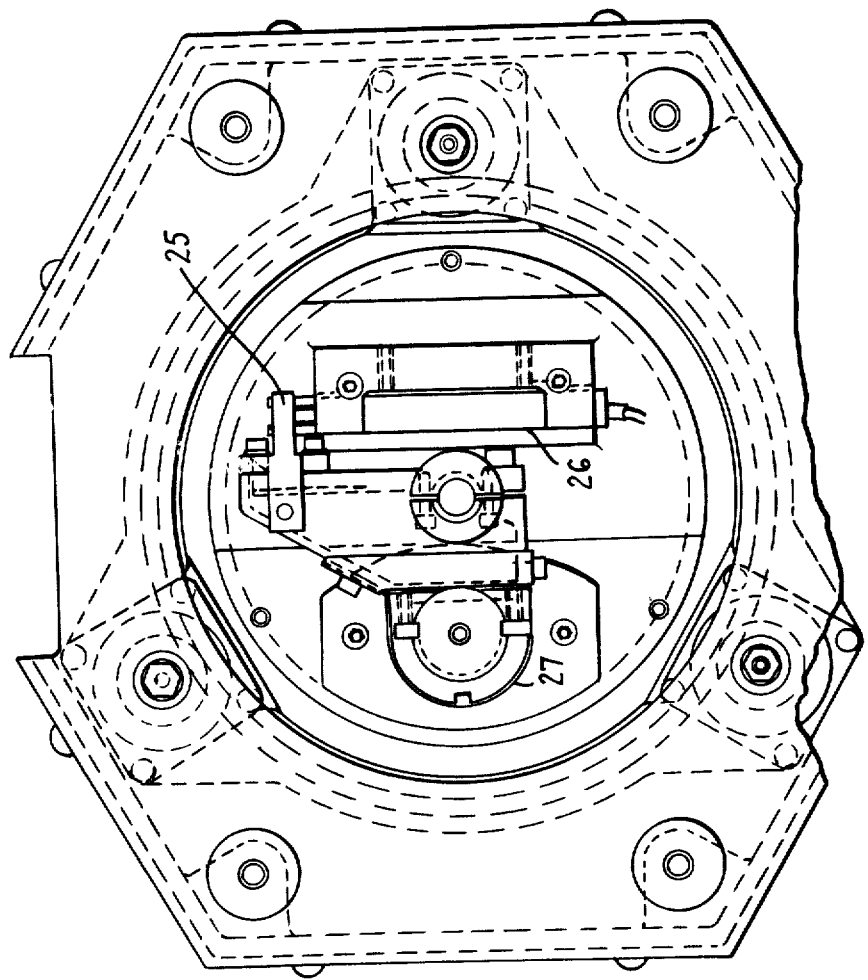
FIG. 2 is a plan view of the weighing apparatus of FIG. 1 with a portion of the outer casing removed.

The weighing apparatus described herein is intended for use in a production line for the manufacture of a continuous stream of small packages. It is thus probable that it will be located in an environment in which there will be considerable externally generated vibrations. This has been mentioned with respect to the inner float chamber 8 and to further reduce the impact of any external vibrations on movement of the float 5 the cover plate 11 is mounted at three points (as best seen in FIG. 2) to an external casing 35 by means of three vibration isolators 36. A fourth vibration eliminator 37 is mounted between the lower end of the main chamber 6 and a raised portion of the base of the external casing 35.

The apparatus may, for example, be used in the production of packages of potato crisps. When used in this way, a quantity of crisps is delivered onto the bucket 1 which is supported by the strain gauge of the submerged float 5. The output of the measuring means including the strain gauge 26 is noted before the delivery of crisps to the bucket, and after a predetermined weight of crisps has been delivered to the bucket an output signal will be given stopping the further delivery of crisps and initiating the removal of the crisps from the bucket 1 to the next stage of the production line. It will be appreciated that in production line of this nature it is important that the weighing should be accomplished accurately, as consistent overreading of the weighing apparatus would lead to packages of under the specified weight which may lay the vendors of the packages open to legal action, and underreading of the apparatus would lead to wastage. The use of a submerged float system means that the actual weight of the moving parts of the weighing apparatus, such as the bucket is almost entirely counteracted by lift generated by the submerged float. Thus the measuring apparatus itself, whether it includes a strain gauge or otherwise, does not have to be capable of withstanding the entire weight of the bucket associated equipment and weighed material, but merely capable of coping with the small amount of the weight, plus the amount of product being weighed. The result of this is that measuring equipment can be used in which an entire scale deflection covers a range of zero to a few ounces. It is a considerably simpler task to provide a desired degree of accuracy with a scale of this range than with a scale having a range of at least an order of magnitude greater as would be the case without the submerged float arrangement.

In fact in the present embodiment the slight movement of the float 5 in response to an imposed load has virtually no effect on the buoyancy of the float as it is always submerged. Thus the weight of the material to be weighed is taken up entirely by the strain gauge itself.

The use of the particular suspension arrangement described for the float 5 is also advantageous. When the correct weight of material has been delivered the load has to be removed from the bucket 1. Thus the material may be swept from the bucket by revolving paddles which sweep through the bucket over its supporting surface.

The suspension system described, whilst allowing free axial movement of the float and bucket, firmly holds the bucket against any transverse movement which may be imparted to it by the paddles, thus removing the need for any additional means for holding the bucket steady whilst being swept clear.

Although the strain gauge 26 as described employs a cantilever arm associated with a semi-conductor chip, many other systems giving an analogue output are available. The alternative forms of cantilever arm strain gauges are known using wire coils or conductive foil in place of the semi-conductor chip, and the cantilever arm-type device may itself be replaced by capacitance or electro-optical means for sensing changes in separation between two elements movable with respect to one another.

We claim:
1. Weighing apparatus comprising:
    a. a frame;
    b. a receptacle for receiving material to be weighed;
    c. a stem secured to the receptacle;
    d. suspension means secured to the stem so that the stem can move substantially vertically with respect to the frame under an applied load; the suspension means comprising two spider members each consisting of a body having a circular rim portion and a plurality of resilient spokes extending generally inwardly to a hub, the hubs of the spider members being secured to the stem at positions spaced axially along the stem, and the rim portions being secured to the frame such that the stem can move resiliently in the vertical direction but that lateral and torsional movement thereof are substantially prevented;
    e. measuring means mounted on the frame and operative to give an electrical output signal varying in accordance with vertical movement of the stem;
    f. a chamber defining a space for housing a liquid medium, and a float located within the chamber, the stem being connected to said float, said float being submerged throughout its normal range of movement so as to give fixed buoyancy irrespective of vertical movement;
    g. said chamber comprising a main float chamber, an inner chamber disposed coaxially within the main float chamber, an opening defined in the wall of the inner chamber through which the liquid medium can pass from the main float chamber to the interior of the inner chamber; and
    h. a plurality of vibration damping devices which interconnect the main float chamber to an outer casing.

2. The weighing apparatus of claim 1, and further comprising adjustable damping means for damping the movement of the float in response to a load imposed thereon.

* * * * *